A. SIEHMON & O. ROST.
APPARATUS FOR THE SEPARATION OF STONES, &c.,
FROM CLAY, &c.
No. 175,774. Patented April 4, 1876.
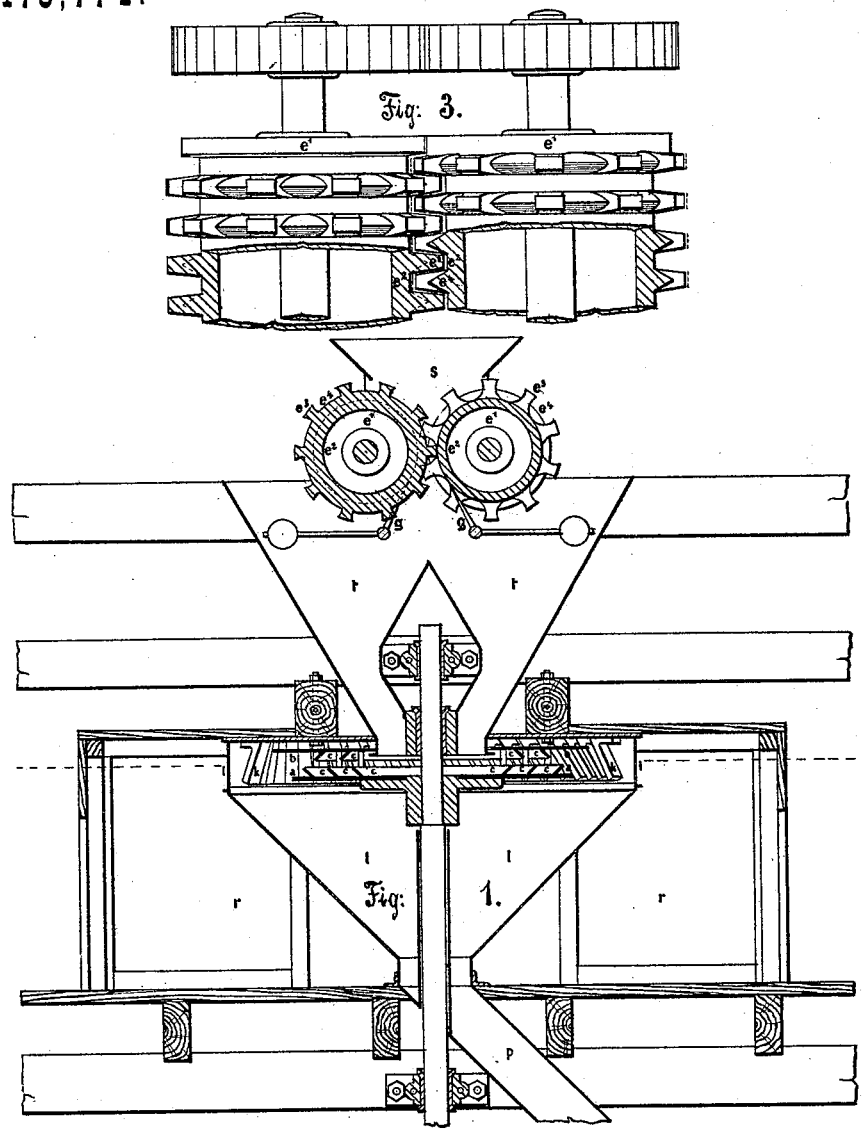
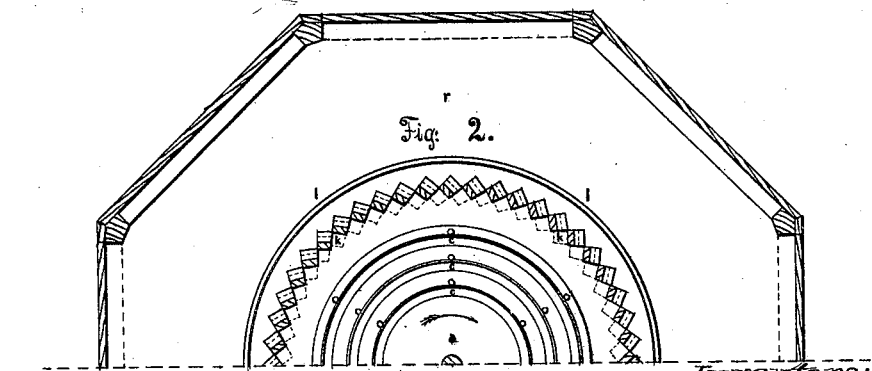

UNITED STATES PATENT OFFICE.

ADOLPH SIEHMON AND OTTO ROST, OF BUDAPEST, HUNGARY, ASSIGNORS OF ONE-HALF THEIR RIGHT TO ANDREW G. MYERS, OF NEW YORK, N. Y.

IMPROVEMENT IN APPARATUS FOR THE SEPARATION OF STONES, &c., FROM CLAY, &c.

Specification forming part of Letters Patent No. 175,774, dated April 4, 1876; application filed March 17, 1876.

*To all whom it may concern:*

Be it known that we, ADOLPH SIEHMON and OTTO ROST, engineers, of Budapest, Hungary, have invented an Apparatus for the Separation of Stone, &c., from Clay and other similar substances, of which the following is a specification:

The object of the present invention is the construction of an apparatus for the purpose of separating stones, &c., from clay or argillaceous substances in general, and other similar materials.

This apparatus is represented on the annexed sheet of drawings. Figure 1 is a vertical section, Fig. 2 is a plan view, and Fig. 3 is a horizontal section of the crushing-rollers, the latter drawn on double the scale of the two former.

The clay is drawn in from the hopper $s$, between the slowly-revolving rollers $e^1$ of peculiar construction. These rollers are designed to break the clods of humid or dry clay into fragments, but without materially reducing the stones, which are to be separated from the former. The peculiar construction of the same is to be seen from figures 1 and 3. On the cylinder $e^2$ are placed the teeth $e^3$, which in the direction of the periphery are connected to each other by ribs $e^4$, having a sharp edge. The two rollers work together by spur-wheels, as shown, and their circumferential speeds are by preference made equal. The clods of clay entering into the spaces between the teeth will be crushed, especially by the action of the edges $e^4$. Stones to within a certain size, embedded in the comparatively soft clay, will not be attacked at all, and the larger ones will in general only be reduced to the size of the others. The scrapers $g\,g$ serve to remove the adhering material.

The clay with the stones, dropping from the roller, fall into a hopper or funnel, $t$, and thence on a rapidly-revolving disk, $a$, fitted with several concentric conical rings, $c\,c$, inclined outward. To this disk a second disk, $b$, provided with similar conical rings, is fixed by stay-bolts. The material to be treated will fly, on account of the centrifugal force imparted to the same by the rotating disks, from the first lower ring $c$ onto the first upper one, then onto the second lower one, and so on, until it is thrown out at the circumference and against the fixed projections K. These may consist of vertical or inclined pins placed close together, but we prefer to apply inclines, placed in the plan vertically to the tangents of the outer conical ring $c$, so that the particles of clay and the stones projected against them may strike the same with the greatest possible force and then fly off downward. The softer parts of the material to be treated are by this process reduced to a coarse powder, while the stones in general remain intact. The former will therefore be in a state to pass through the holes of the conical sieve or screen $l$ into the box $r$, and the stones, now separated, fall through the tube $p$ into any convenient receptacle.

The clay, it is true, will not be entirely free from very small stones and particles of such as may have been broken by the rollers, but these have no prejudicial influence in the manufacture of bricks and other coarse articles of clay. If complete purity is desired, a process of washing will always be found indispensable, and for such cases the apparatus is not intended.

According to the experiments made with our apparatus, clay mixed with knolls of limestone to a degree as to be almost useless, or at least to allow the manufacture of bricks of very inferior quality only, has been converted by the same into a first-rate material for this purpose.

The apparatus will also be found useful for separating iron and other ores from adherent clay, and for simply reducing pure but very tenacious sorts of clay to powder.

We claim as our invention—

1. The shape of the crushing-rollers, having teeth $e^3$ with peripherical sharp-edged ribs $e^4$ between them, as described.

2. The two revolving disks $a$ and $b$, bearing the concentric conical rings $c$, as and for the purpose specified.

3. The fixed projections K surrounding the revolving disks $a$ and $b$, as stated.

In testimony whereof we have signed our names to this specification in the presence of two subscribing witnesses.

ADOLPH SIEHMON.
OTTO ROST.

Witnesses:
WM. HINING,
FERDINAND GERBER.